United States Patent [19]

Purcell et al.

[11] Patent Number: 4,952,757

[45] Date of Patent: Aug. 28, 1990

[54] LOW-POWER ELECTROMAGNETIC DIGITIZER TABLET

[75] Inventors: Alexander M. Purcell, Guilford; Thomas C. Zalenski, Killingworth, both of Conn.

[73] Assignee: Summagraphics Corporation, Seymour, Conn.

[21] Appl. No.: 436,619

[22] Filed: Nov. 15, 1989

[51] Int. Cl.⁵ ............................................. G08C 21/00
[52] U.S. Cl. ..................................................... 178/19
[58] Field of Search ................................... 178/18, 19

[56] References Cited

U.S. PATENT DOCUMENTS

| | | |
|---|---|---|
| 4,087,625 | 5/1978 | Dym et al. ............................. 178/19 |
| 4,451,698 | 5/1984 | Whetstone et al. .................... 178/19 |
| 4,659,874 | 4/1987 | Landmeier .............................. 178/19 |
| 4,705,919 | 11/1987 | Dhawan ................................. 178/19 |
| 4,771,138 | 9/1988 | Dhawan ................................. 178/19 |

*Primary Examiner*—Stafford D. Schreyer
*Attorney, Agent, or Firm*—Rosen, Dainow & Jacobs

[57] ABSTRACT

A low-power electromagnetic digitizer table employing triangular-shaped electrodes arrayed in a single plane. A pointing device coil when energized induces signal voltages in the electrodes underneath. The electrodes are scanned in timed relation, and the induced voltages digitized and compared to determine the X/Y coordinates of the pointing device with respect to the electrode array.

10 Claims, 4 Drawing Sheets

LOW-POWER ELECTROMAGNETIC DIGITIZER TABLET

This invention relates to digitizer tablets for locating the position of a pointing device over a grid structure, and in particular to such digitizer tablets of the type employing electromagnetic induction for position location.

BACKGROUND OF THE INVENTION

Digitizer tablets are well known in the art. In one popular type, the pointing device comprises a coil in a cursor or stylus configuration which is positioned by a user over a tablet surace in which is embedded a wire grid extending in two coordinate directions. In one mode, the pointing device coil is energized to electromagnetically induce signals in the grid wires. In another mode, the grid wires are energized to electromagnetically induce signals in the pointing device coil. In both modes, the grid wires are sequentially addressed, either one at a time or in groups, to provide an output analog voltage in timed relation to the grid addressing. The output voltage with increasing time reaches a maximum, passes through zero, and then reaches a minimum in the vicinity of the pointing device coil. When addressing begins, a counter is activated which keeps track of the particular grid line addressed. A stop signal for the counter is generated when the zero crossover is determined. The count value determines the location of the pointing device with respect to the two or three closest grid wires. Examples of patents describing in more detail this type of digitizer are Kamm et al 3,904,822; Ioanau 3,873,770; and Zimmer 4,368,351, whose contents are hereby incorporated by reference.

In a typical tablet, the stylus or cursor position is expressed as an X, Y coordinate pair, with the X and Y axes having their normal orientation for an origin at the lower, left-hand corner of the tablet. The Z axis in this coordinate system is upward from the tablet surface. For most tablets, the Z axis represents proximity, which is the maximum distance above the tablet's active area that the cursor or stylus can be held and still report a valid position. Thus, the Z coordinate is typically represented only as one of two binary values. Another way of utilizing the Z axis is as a binary switch. In this mode, a switch (sometimes called a button) is incorporated inside the barrel of the stylus and is connected to the stylus tip. The switch is normally open and is activated by the user pressing the stylus tip against the tablet. The switch action can be used in the same manner as an outside button on the stylus or as the buttons on a cursor.

While the above-described tablets perform very well, with high resolution and high accuracy, they are relatively expensive to manufacture. One contribution to expenses is the need to provide the electrode arrays for the X and Y axes in separate planes, carefully aligned with one another. This means two careful circuit printing steps. In addition, the typical X or Y electrode array comprises wires spaced 0.25 inches apart across the active tablet area, meaning the tablet surface area for which valid coordinate pairs are generated.

Thus for a 12 inch tablet, a total of 48 wires are needed. For sequential scanning, a 48 X 1 multiplexer (Mux) would be required. As such components are far too expensive, the normal solution is to concatenate two 8 X 1 Muxs. Thus, two Mux chips per coordinate is required.

Tablet constructions have been suggested to reduce costs. For example, Summagraphics, the assignee of this application, manufacturers a so-called CR tablet, described in U.S. Pat. Nos. 4,705,919 and 4,771,138. This tablet uses an electrode array in a single plane, but depends on electrostatic coupling to the pointing device for position location. While such tablets also perform satisfactorily, the hoped for goal of an inexpensive tablet has not quite been reached. The major obstacle is that, relying on electrostatic or capacitive coupling, rather than electromagnetic coupling, introduces additional problems, such as reduction in signal-to-noise ratio, smaller proximity heights, and lower signal magnitudes. As a result, signal processing must be enhanced to maintain resolution and accuracy. This usually requires more electronic components, again increasing costs.

Other patents describing single layer electrode arrays using capacitive coupling are U.S. Pat. Nos. 4,087,625 and 4,659,874.

SUMMARY OF THE INVENTION

A principal object of the invention is a low cost digitizer tablet.

Another object of the invention is low cost digitizer tablet using electromagnetic technology.

In accordance with one aspect of the invention, an electromagnetic digitizer tablet comprises an array of electrodes extending in a single plane. The electrodes are configured such that when appropriately addressed after having voltages induced therein, signal information is derived which when processed will generate signals representing both X and Y coordinates of the location of an overlying pointing device electromagnetically coupled to the active area.

In accordance with another aspect of the invention, the electrode array is substantially co-extensive with the active area of the tablet.

In accordance with a further aspect of the invention, the electrode array comprises a row of triangular shaped electrodes laid out in pairs with the triangle apices extending along the Yaxis of the tablet, and the electrode pairs extending in a row along the X-axis of the tablet. With this configuration, the Xcoordinate and Y-coordinate are determined by time-related addressing of the triangular coils, using the magnitude of the signal voltages induced in each coil.

In a preferred embodiment of the invention, the triangular coils of each pair face in opposite directions so that each pair forms substantially a rectangle. With this arrangement, it is preferred that the diameter of the pointing device coil substantially equals the width of the triangle base, which substantially corresponds to the width of the rectangle formed by the electrode pair. In this embodiment, each electrode is formed by a single coil.

In another preferred embodiment, each electrode of a pair is constituted of a plurality of nested triangles, connected end to end, to form a plurality of loops or coils within a triangular area. This arrangement will increase the signal level output.

SUMMARY OF DRAWINGS

The invention will now be described in greater detail with respect to several preferred embodiments, reference being had to the accompanying drawings wherein.

DETAILED DESCRIPTION OF PREFERRED EMBODIMENTS

Figure 1:
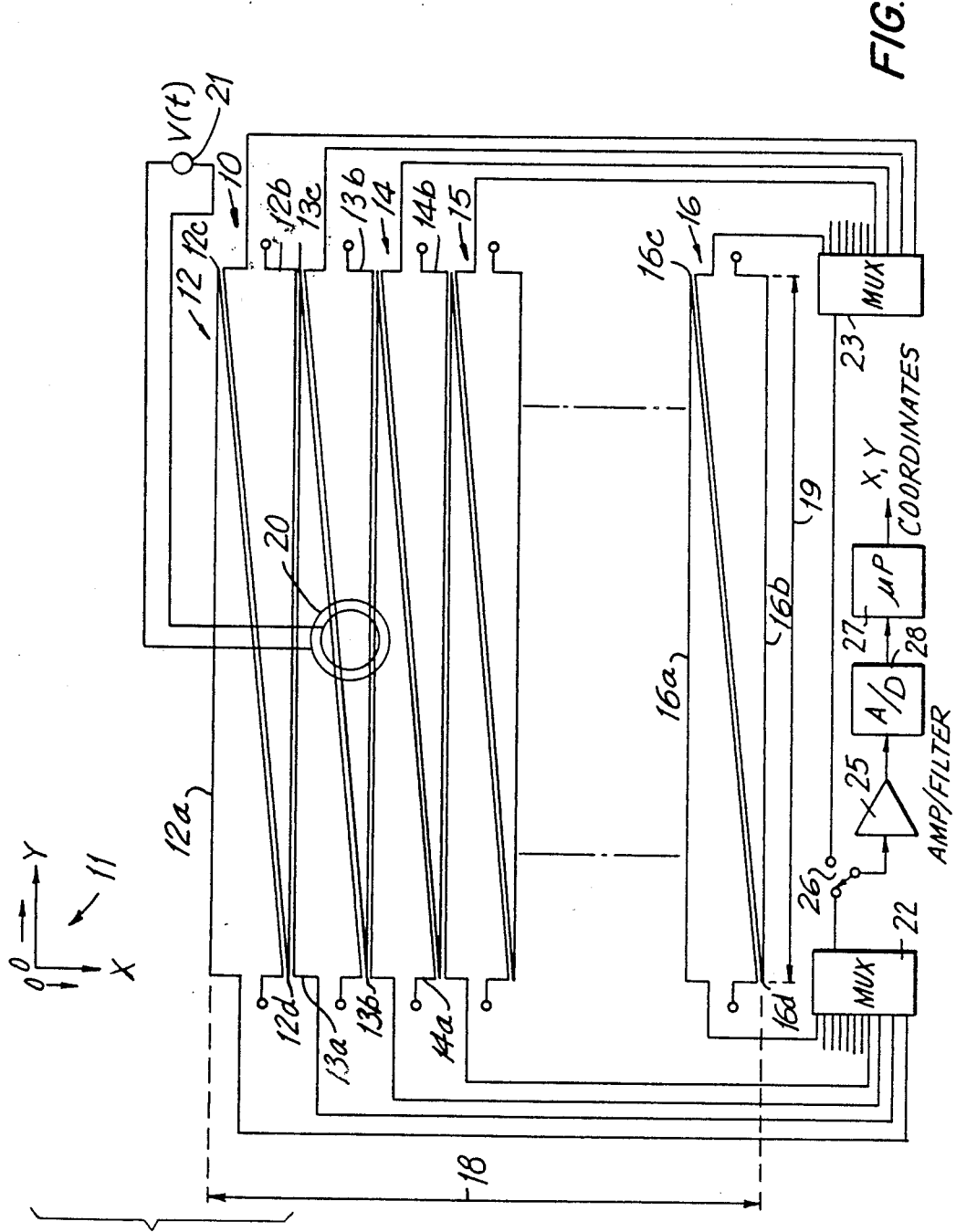
FIG. 1 is a schematic plan view of a digitizer tablet according to the invention showing the general electrode layout and processing circuitry.

FIG. 1 illustrates the electrode geometry and circuitry for a preferred embodiment of a digitizer tablet in accordance with the invention. The complete electrode array for the X and Y coordinates is shown and designated 10. The array is shown with the tablet rotated 90° CCW from its normal user position, in which the origin of the X-Y coordinate system is at the lower left hand tablet corner. This is indicated at 11 by the X-Y axis symbol.

The electrode array comprises a row of triangular-shaped wire loops extending in the X-axis direction (vertical in FIG. 1). The wire loops are laid out in pairs, with the apex of one triangle of the pair adjacent the base of the other triangle of the pair, so that each pair referenced 12–16 forms a rectangle as shown. Each pair 12–16 is sometimes referred to as a segment. The electrodes of each pair are referenced a and b, and their apex c and d. Thus, 12a is the first wire loop at the top with apex 12c, and 12b is the adjacent wire loop with apex 12d, and so on. The space between electrode pairs 15 and 16 would be occupied by additional electrode pairs. We prefer to use for a 12 inch active tablet area a total of 16 active electrode pairs or segments. The dimensions referenced 18 and 19 represent the active area of the tablet along the X and Y axes, respectively. As will be noted, the electrode array 10 is substantially coextensive with the tablet active area. It may be desirable, as explained below, to add one additional segment at each end of the active area. These would therefore be located just outside the active area. They would be used in the calculation to determine the X-coordinate value.

In the tablet of the invention, a pointing device is operated by the user over the tablet active area. The pointing device is represented in FIG. 1 by a coil 20. The coil is energized in the normal way by connection to a current source 21 which supplies it with an AC current at a frequency of, for example, 10 kHz, which is typical for digitizer tablets. The coil 20, acting as a transformer primary, generates an electromagnetic field which intersects the electrode array 10, as a result of which AC electrical signals are induced in the underlying triangular coils acting as transformer secondaries. Each triangular coil 12a, 12b–16a, 16b are in time sequence connected, one by one, by a pair of switched 1 X 8 multiplexers 22, 23 to the input of an amplifier having a low-pass filter 25. A switch 26, as well as the multiplexers 22, 23, are controlled by a microprocessor or microcontroller 27 so that the signals induced in each coil are coupled in turn to the amplifier 25. The preferred electrode scanning sequence is coil 12a, 12b, 13a, 13b, 14a, 14b, 15a, 15b . . . 16a, 16b. Other scanning sequences can also be used. The analog output signals from the amplifier-filter 25 are sampled and converted into digital signals by an A/D converter 28, and stored in memory incorporated in or connected to the microprocessor 27. The microprocessor 27 then processes the signals in a manner to be described below and ultimately generates an X, Y coordinate pair representing the location of the center of the pointing device coil 20 with respect to the origin of the X, Y coordinate system. In FIG. 1, the coil terminals marked with a small circle are commonly connected to a reference potential such as ground. This common connection has been omitted to avoid cluttering up the drawing.

Figure 2:
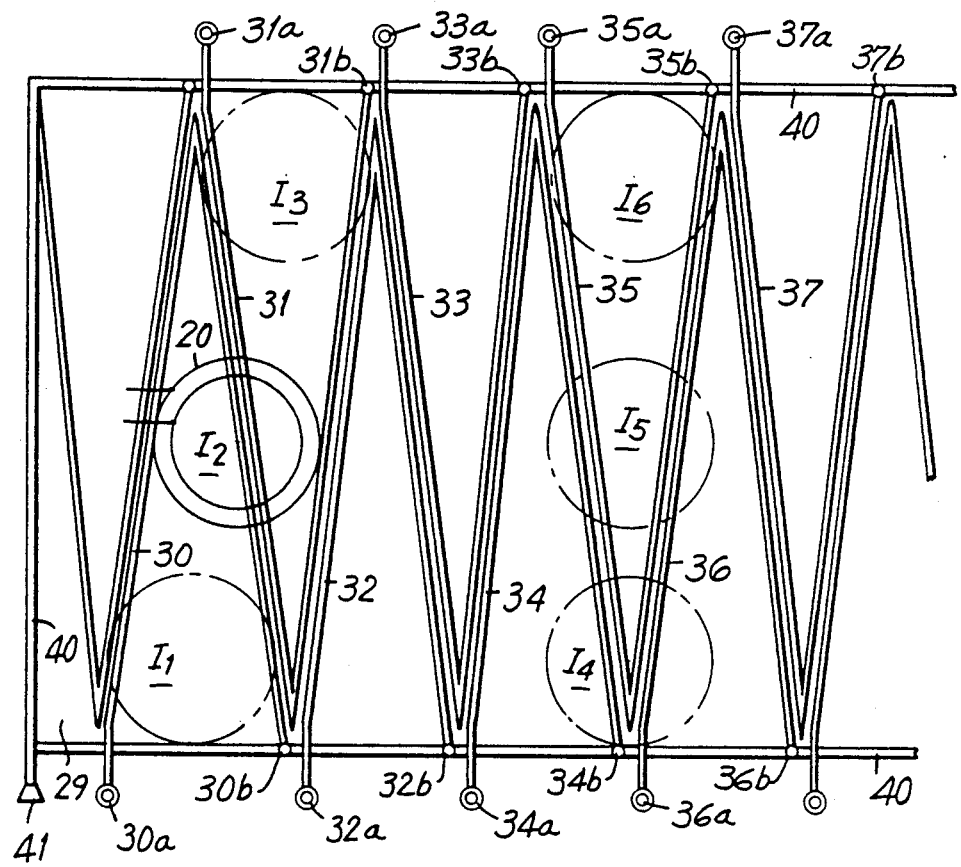
FIG. 2 is an enlarged top view of part of the electrode array of FIG. 1.
Figure 3:
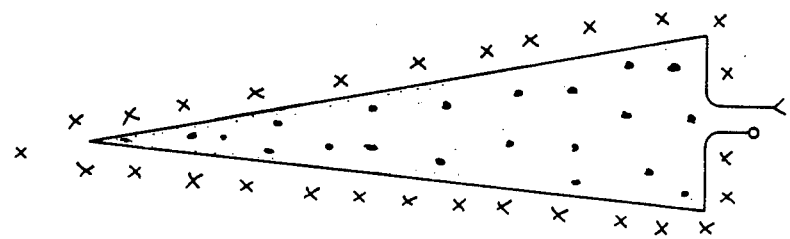
FIG. 3 is, a plan view of one coil of the array of FIG. 2 showing the electromagnetic field distribution.

FIG. 2 is an enlarged, schematic view of several coils of the electrode array to illustrate operation of the tablet of the invention. FIG. 3 shows one such coil. In FIG. 1, the triangle shapes were right triangles, with the right angle sides of each electrode pair (e.g., 12a, 12b) forming the sides of a rectangular segment extending in the Y-direction. In FIG. 2, the layout is somewhat different, in that each triangle is an equilateral triangle. The advantage of the FIG. 1 layout is that the right angle sides can substantially coincide with the tablet active area boundaries. In the FIG. 2 layout, there will be a corner at each end, designated 29, outside the array, which may not be interacting in quite the same manner as other tablet locations. This, however, can be compensated, if desired, by the signal processing circuits.

As will be observed in FIG. 2, each of the complete coils shown 30–37 has a first external terminal at its base, which is referenced a, and a second base terminal, b, connected to a common bus represented by the thicker line 40. The bus 40 is connected to a point 41 of reference potential, such as ground. Each of the first coil terminals 30a–37a are connected to the multiplexers 22, 23. The pointing device coil 20 as in FIG. 1 is represented by a circle. Different coil positions are shown in dash-dot lines. It will be observed that the coil diameter substantially equals the triangle base width or the width of the tilted rectangle formed by adjacent triangles. The different coil positions have been designated $I_1$–$I_6$.

FIG. 3 shows the electromagnetic radiation pattern for one electrode coil when the pointing device coil is energized, during one half cycle, and when the pointing device coil is located in the $I_1$, $I_3$ or $I_6$ positions, that is, over only one electrode coil. The Xs represent field lines into the drawing plane, and the dots field lines coming out of the drawing plane. The signal magnitude induced in the underlying electrode coil is a maximum. The induction coupling to the neighboring coil apex ends is small or a minimum for those coils. When the pointing device coil is moved to a center position, such as $I_2$, approximately equal signal magnitudes are induced in electrode coils 30 and 31. In pointing device coil position $I_4$, smaller magnitude signals are induced in three coils 34, 35 and 36. In position $I_5$, again signals are induced in the same three electrode coils 34–36, but their relative magnitudes will differ. The induced signal magnitudes for each coil are separately determined by the multiplexing scheme depicted in FIG. 1. X and Y coordinate positions are determined by comparing the three highest digital signal outputs. This is, essentially, a voltage ratio determination or measurement which gives both X and Y coordinate locations. Generally, the processing will occur in stages. In the first stage, the X coordinate is determined and stored. In the second stage, the Y coordinate is determined and stored. These can be reversed, if desired.

For instance, for the X coordinate for the six pointing device positions shown, the stored digital data would be analyzed as follows. For $I_1$, the digital output for coil 30 would be maximum. For $I_3$, the digital output for coil 31 would be maximum. For $I_6$, the digital output for coil 35 would be maximum. For $I_2$, the digital output for coils 30 and 31 would be about the same. For $I_4$, the digital outputs for coils 34 and 36 would be about the same, but for coil 35 in between would be lower. For $I_5$, the digital output for coil 35 would be larger than the two substantially equal outputs for adjacent coils 34 and 36. It turns out that for every horizontal or X-axis location of the pointing device coil 20, whatever the Y-axis position, there exists a unique combination or ratio of digital outputs which can be converted or translated into an X coordinate value.

A similar process is used for determining Y-axis location. For every Y-axis location, for the X-axis location previously identified, a unique combination or ratio of electrode coil digital outputs exists which can be converted or translated into a Y coordinate. This conversion can be accomplished mathematically, by calculation, or by a look-up table which stores the unique digital output values for each Y-axis digital output.

Figure 4:
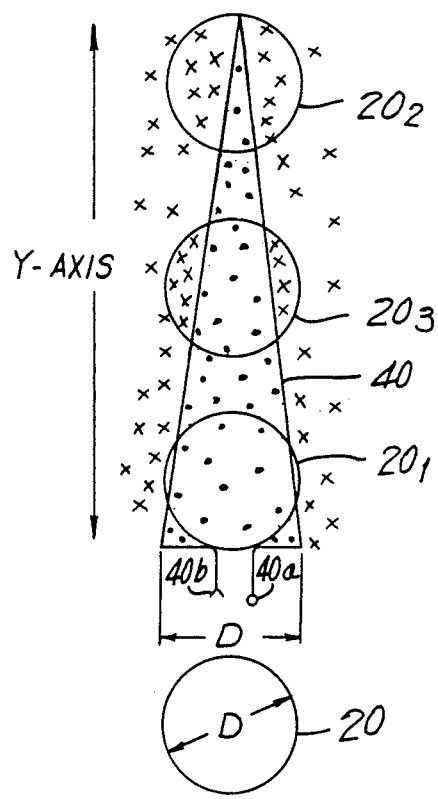
FIG. 4 and 5 are schematic detail views of the tablet of FIG. 1 illustrating its geometry and operation.

FIG. 4 illustrates the change in induced voltage in an electrode coil designated 40 depending upon the Y-axis position of the pointing device coil 20. Again, the Xs represent field lines into the drawing plane, and the dots field lines out of the drawing plane. The pointing device coil, shown below, has a diameter D approximately equal to the base width D of the triangular coil. In the lowermost position of the pointing device coil $20_1$, the maximum number of out field lines and the minimum number of in field lines couple to coil 40. This results in a maximum induced signal voltage. At the opposite uppermost position $20_2$, the induction situation reverses, with the number of in lines minimized and the number of out lines maximized. This results in a minimum induced signal voltage. At substantially a middle position of the pointing device coil $20_3$, the in and out field lines are approximately equal, producing a middle value of induced signal. Thus, the Y-axis position of the pointing device coil relative to a particular triangular electrode coil is indicated by the magnitude of the output signal induced in the coil. This relationship is enhanced when the pointing device coil diameter D substantially equals the base width D of the triangular coils (not shown in FIG. 4) which are inverted with respect to coil 40. Thus, the ratio of the induced signal voltages in adjacent inverted triangular electrodes is an unambiguous indication of Y-axis location of the pointing device coil center.

Figure 5:
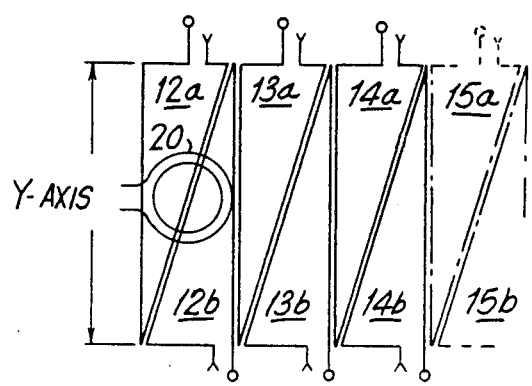

FIG. 5 again illustrates the preferred geometry of rightangle triangular-shaped electrode coils, using the reference numerals of FIG. 1. The terminals marked 0 are grounded, and the terminals marked V are connected to the multiplexers 22, 23 as shown in FIG. 1.

As mentioned above, in the preferred embodiment, for a typical 12 x 12 inch tablet, only 16 pairs of triangular electrodes are required, each pair forming a rectangular segment with a width of about 0.75 inches. All electrode coils are made in a single printed wiring operation, and all extend in a single plane. All triangles are of the same size. This leads to the desired low-cost manufacture. In view of the small number of electrode coils, the number of electronic components are reduced. This also reduces costs. Again because of the small number of coils, the tablet consumes less current. The result is a low power tablet. While 16 pairs are preferred for the 12 inch tablet, a smaller number can also be used, such as 8 pairs. For larger tablets, for example 15 x 15 inches, 20 sets of coils could be used, again with a 0.75 inches base width, but in this case the triangle height would be 15 in. Thus, the invention is not limited to a specific number of coil sets.

While the preferred scanning of the electrodes is as a single scan alternating between the lower triangles (bases facing the 0 Y axis) and the upper triangles (bases facing the maximum Y axis), this can be divided into two scans, first for one coordinate and then for the second coordinate. In this mode, the stored digital values would first be compared to determine the Y coordinate. The ratio measurements are not linear in the Y-direction. Since it would be difficult in hardware to implement a complex calculation, it is preferred to use a look-up tablet to determine the Y-coordinate, using as the index into the table the ratio of the two highest outputs of a segment. For the X coordinate, the microprocessor would examine and compare the values of the highest digital outputs of a segment with the values of outputs for the segments on either side. This will be approximately linear, and thus is readily calculated. If desired, appropriate compensation for digitized values measured along the X-axis can be provided to compensate for X-axis non-linearities.

To illustrate the above, assume a typical user session, with the pointing device coil 20 located as shown in FIG. 1 over the array 10. When the scan of induced voltages is completed, the stored raw digital outputs would appear as indicated in the table below. Values not relevant have been omitted from the table:

| ELECTRODE NO. | SEGMENT No. | DIGITAL OUTPUT A | B |
| --- | --- | --- | --- |
| 12a | 1 | 30 | |
| 12b | 1 | | 20 |
| 13a | 2 | 120 | |
| 13b | 2 | | 100 |
| 14a | 3 | 80 | |
| 14b | 3 | | 30 |
| 15a | 4 | 20 | |
| 15b | 4 | | 16 |
| . | | | |
| . | | | |
| . | | | |
| 16a | 16 | 2 | |
| 16b | 16 | | 2 |

To determine Y-axis location, the ratio of the two values of a segment with the highest output values are determined, referred to as a "first ratio". For this example, the first ratio for values outputted for electrodes 13a and 13b is determined. This ratio is $120/100 = 1.2$.

The value of 1.2 would then be used to index into a lookup table which would return the absolute Y-coordinate value (measured from the origin). For a tablet accuracy of 0.01 inches, for a 12 inch tablet, 1200 table entries would be required, which would be factory determined and set into a ROM or EEPROM during calibration of the tablet.

For the X axis location determination, three segment output values are compared. First, as in the Y-coordinate determination, the segment with the highest output or MAX is determined and the electrode identified. For simplicity, with reference to FIG. 1, the electrodes 12a, 13a ... 16a will be referred to as the A electrodes and electrodes 12b, 13b ... 16b as the B electrodes. If the MAX value is from an A electrode, then only A outputs are used; if from a B electrode, then only B outputs are used.

Then the difference between outputs of that segment electrode A or B, with the corresponding A or B electrode on either side, are determined. Assuming, from the table, the segment with the highest output is for segment No. 2, herein "N", (segment 13 in FIG. 1), from an A electrode (13a), then the difference between the output from the A electrodes of segment N and segment N−1 (segment 12 in FIG. 1), called the "first difference" is determined, and also the difference with segment N+1 (segment 14 in FIG. 1), called the "second difference". The first and second differences are also called R and S respectively. Then, the X-coordinate in inches becomes $[N+R/(S+R)]K$, where N is the number of the segment with the highest output (N=2 in FIG. 1), and K is a constant equal to the total tablet dimension in the X-direction in inches divided by the total number of active segments. For the example give above, N=2 for the segment with the largest output, from electrode 13a. Since it is an A electrode, only A values are used in the following calculation. If it were a B electrode, only B values would be used in the following calculation.

Thus, R=output for segment(N)−output for segment (N−1) (120−30=90), S=output for segment (N)−output for segment (N+1) (120−80=40), K=12/16=0.75, and thus the X-coordinate is (2+90/(40+90)) 0.75=2.02 inches from the origin.

As mentioned previously, one additional segment (not shown) is preferably added at each end of the tablet. These are desirable for running the X-coordinate calculation when the pointing device is located over the first segment 12 or the last segment 16, to provide, respectively, an output from the N−1 and N+1 segment for the calculation. This is similar to techniques used in known tablets to reduce or eliminate edge effects. In this case, the numbering of the segments remains the same, as well as the value of K, since it is the active tablet dimension that is important.

This again assumes substantial linearity. There may be certain non-linear relationships between these determined ratios for different locations over the tablet area. In other words, the ratios may not come out to the same number when measurements are made along the X-axis for different Y values. This can be readily compensated by mapping the measured ratios to pointing device locations, and constructing a table of additions or subtractions to the measured digital outputs to compensate for nonlinear regions. These value adjustments can be made before the ratio calculations are carried out.

While the above method for calculating the pointing device X-coordinate is preferred, the invention is not limited thereto and other calculations based upon the digital outputs obtained from the scanned electrodes and which will convert them into an X/Y coordinate pair are deemed within the scope of this invention, as is the use of a look-up table where excessive nonlinearity is present.

Figure 6:
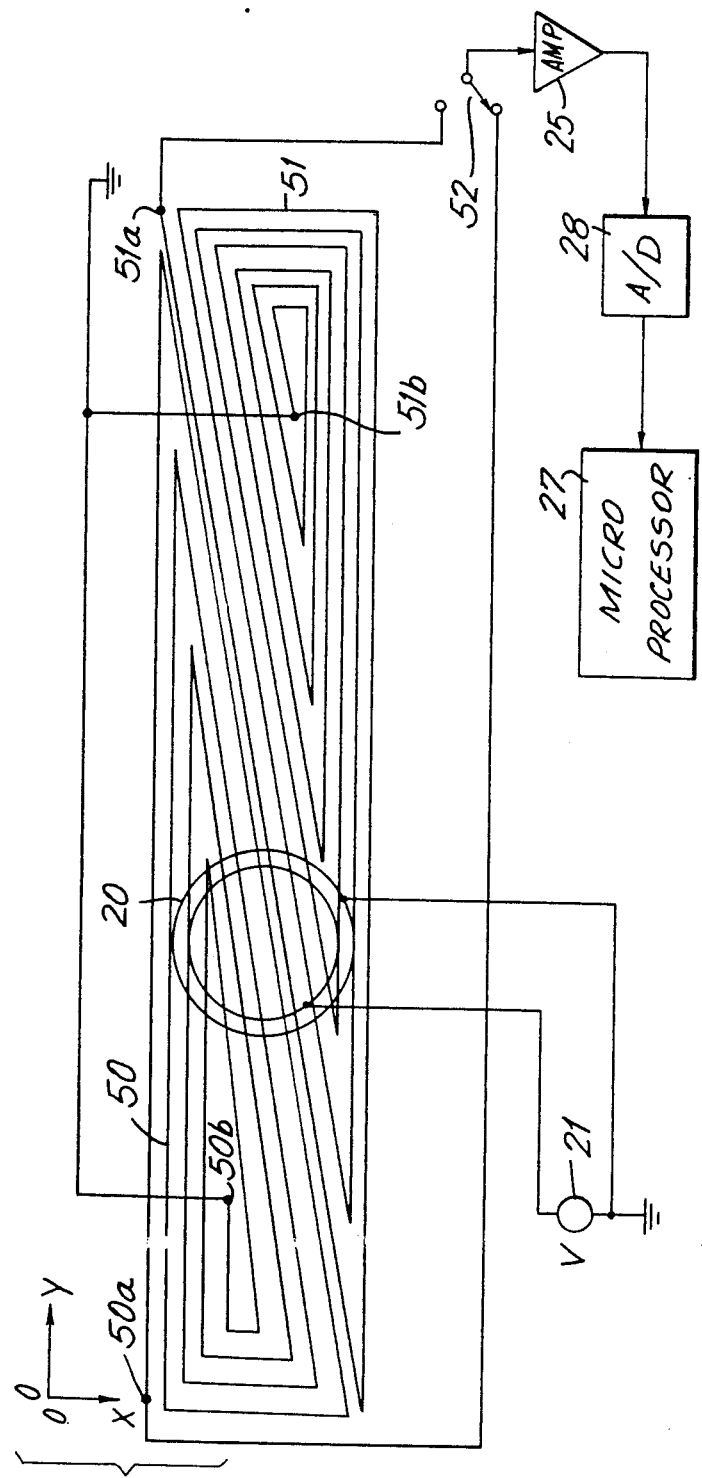
FIG. 6 is a plan view of one pair of electrodes for an array constituting a second embodiment of the invention.

The preceding figures illustrate an embodiment in which a single loop coil is provided in each triangular area. The embodiment illustrated in FIG. 6 employs a multiple loop coil for each triangular area. FIG. 6 illustrates just one coil set forming one rectangle comparable to coils 12a and 12b forming one set 12 as illustrated in FIG. 1. Thus, for the full tablet, the coil set illustrated in FIG. 6 would be replicated downward along the X-axis to the X end of the tablet. The pointing device coil, as in the other embodiments, is designated 20. The two side by side electrode coils making up a single set are designated 50 and 51. As will be observed, each of the coils 50, 51 have a first terminal 50a, 51a connected to a switch 52 corresponding to the switch 26 of the FIG. 1 embodiment. With multiple coil sets, their connections will go to multiplexers, which have been omitted for clarity. Each coil 50, 51 is a single continuous conductor forming multiple loops or turns which decrease in size, necessary since the coil is printed in a single plane. The number of nested loops illustrated is four in number. The conductor terminates in a terminal 50b, 51b, which is connected to ground as shown. As before, the pointing device coil diameter is approximately the same as the width of the rectangle formed by the coil set. The length of the rectangle corresponds to the dimension of the active area of the tablet in the Y direction. The signals induced in each of electrode coils when the supply 21 is energized and the electrode coils scanned is processed as before. The advantage of the coil layout of this embodiment is that the range of induced voltages when the pointing device is moved from the electrode coil base (its widest part) to its apex is greatly increased. This is because at the base region, more coil loops or turns exist and can couple to the pointing device coil than at the apex. This greater range of digital outputs will increase the resolution of the tablet not only for Y-axis measurements, but also for X-axis measurements. However, the change in induced voltage per unit change in Y-axis or X-axis pointing device position may not be the same as previously described. Hence, to calculate pointing device location, it may be necessary to calibrate the tablet to map digital outputs to pointing device position, and use either a look-up table which contains that mapping to determine the X/Y coordinates, or establish a function that relates digital output to pointing device location, and then calculate that function given the digital output to determine pointing device location. This is well within the skill of those in this art and need not be further elaborated on here.

There has thus been described a novel digitizing tablet employing an electrode array in a single plane which will provide both the X and Y coordinates of a pointing device. The tablet is compact since the electrode array is substantially coextensive with the tablet active area. The tablet can be manufactured at low cost due to fewer electrodes, single side printing, and fewer electronic components. Most important, by employing electromagnetic induction instead of electrostatic or capacitive coupling, the tablet will require less power to operate. With low-power components, such as C-MOS circuits, it should be possible to operate the tablet from a low power voltage supply, and even by a battery for a reasonable time period. Thus, the foundation for a portable digitizer tablet exists, which would expand its fields of application.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A electromagnetic digitizer tablet comprising an electrode array under an active tablet area and a pointing device having an inductor which when energized when the pointing device is over the electrode array will electromagnetically induce electrical signals in the array, the improvement comprising:
   (a) said electrode array comprising a plurality of triangular-shaped electrodes distributed side-by-side underneath the active tablet area such that the apices of adjacent triangular-shaped electrodes lie adjacent opposite sides of the active tablet area,
   (b) means connected to each electrode for determining the electrical signal induced in each triangular-shaped electrode,
   (c) means for locating the pointing device inductor position relative to the electrode array based upon the signal levels induced in each electrode of the array.

2. The digitizer tablet as claimed in claim 1, wherein each triangular-shaped electrode has first and second terminals at the end of each long side, the means of element (b) are connected to the first terminal of each of the triangular-shaped electrodes, and the second terminals of the triangular-shaped electrodes are all connected to a common reference potential point.

3. The digitizer tablet as claimed in claim 2, wherein the pointing device inductor is a coil having a diameter approximately equal to the width of the base of triangular-shaped electrode.

4. A electromagnetic digitizer tablet comprising an electrode array under an active tablet area and a pointing device having an inductor which when energized when the pointing device is over the electrode array will electromagnetically induce electrical signals in the array, the improvement comprising:
   (a) said electrode array comprising a plurality of triangular-shaped wire electrodes each having two long wire sides connected at an apex, said electrodes being distributed side by side underneath the active tablet area such that the apices of adjacent triangular-shaped electrodes lie adjacent opposite sides of the active tablet area, a first terminal connected to the end of one long wire side opposite to its apex, a second terminal connected to the end of the other long wire side,
   (b) means connected to the wire terminals for:
     (i) determining, via its terminals, the electrical signal induced in each triangular-shaped electrode,
     (ii) locating the pointing device inductor position relative to all of the triangular-shaped electrodes by comparing the level of the signal induced in each electrode to that induced in neighboring electrodes.

5. The digitizer tablet as claimed in claim 4, wherein the active tablet area has an X-axis dimension and a Y-axis dimension, the height of each triangular-shaped electrode corresponds to one of the X and Y dimensions, and the distributed plural electrodes extend to a distance corresponding to the other of the X and Y dimensions.

6. The digitizer tablet as claimed in claim 5, wherein the means (b) comprises means for scanning in timed relation the first terminals of each of the electrodes, the second electrodes being commonly connected.

7. The digitizer tablet as claimed in claim 6, wherein the means of (b) comprises an A/D converter to convert the induced signal voltages into digital outputs.

8. The digitizer tablet as claimed in claim 7, wherein each pair of adjacent triangular-shaped electrodes comprise a segment, and the means of (b) comprises means for comparing the highest digital output from a segment electrode of the array with that of the other electrode of the same segment to locate the inductor with respect to said one tablet dimension, and means for comparing the highest digital output from a segment of the array with that of corresponding electrodes from adjacent segments to locate the inductor with respect to said other tablet dimension.

9. The digitizer tablet as claimed in claim 4, wherein each triangular-shaped electrode comprises a right-triangle shape, each pair of triangular-shaped electrodes forming a rectangle whose sides are parallel to the active tablet area.

10. The digitizer tablet as claimed in claim 4, wherein each triangular-shaped electrode comprises multiple nested loops.

* * * * *